(12) United States Patent
Mey

(10) Patent No.: US 6,676,349 B1
(45) Date of Patent: Jan. 13, 2004

(54) SINGLE-PIECE FIXING ELEMENT IN THE FORM OF A SCREW OR NAIL

(76) Inventor: Klaus-Peter Mey, Aachener Strasse 710, D-50226 Frechen (DE)

( * ) Notice: Subject to any disclaimer, the term of this patent is extended or adjusted under 35 U.S.C. 154(b) by 0 days.

(21) Appl. No.: 09/958,134

(22) PCT Filed: Apr. 6, 2000

(86) PCT No.: PCT/EP00/03055
§ 371 (c)(1), (2), (4) Date: Oct. 4, 2001

(87) PCT Pub. No.: WO00/60984
PCT Pub. Date: Oct. 19, 2000

(30) Foreign Application Priority Data

Apr. 8, 1999 (DE) ............................. 199 15 913

(51) Int. Cl.[7] ................................. F16B 15/02
(52) U.S. Cl. ................. 411/80.5; 411/398; 411/923
(58) Field of Search .................. 411/398, 400, 411/401, 923, 80.1–80.6, 482, 485

(56) References Cited

U.S. PATENT DOCUMENTS

| | | | | |
|---|---|---|---|---|
| 274,743 | A | * | 3/1883 | Du Shane |
| 944,725 | A | * | 12/1909 | Ferguson |
| 2,282,389 | A | * | 5/1942 | Argo |
| 2,283,766 | A | * | 5/1942 | Sbicca |
| 2,286,723 | A | * | 6/1942 | Frost |
| 3,006,443 | A | | 10/1961 | Siler |
| 3,408,924 | A | * | 11/1968 | Mueller |
| 3,606,814 | A | * | 9/1971 | MacKenzie |
| 5,059,077 | A | | 10/1991 | Schmid |
| 5,482,419 | A | * | 1/1996 | Leistner |

FOREIGN PATENT DOCUMENTS

| | | |
|---|---|---|
| DE | 8701972 | 7/1987 |
| DE | 3834285 | 4/1989 |
| DE | 4337927 | 5/1995 |
| FR | 494055 | 12/1918 |
| FR | 2366481 | 4/1978 |

* cited by examiner

Primary Examiner—Flemming Saether
(74) Attorney, Agent, or Firm—Friedrich Kueffner

(57) ABSTRACT

The invention relates to a fixing element that essentially consists of a head (1) and a shaft (2) and is preferably configured as a nail or screw. The aim of the invention is to provide said fixing element in such a way that it can be easily assembled and adjusted and preferably adjusted in the horizontal level between several fixing elements. To this end, the head (1) is provided with a variable lifting height (h) and preferably consists of an upper head component (10) and a lower head component (11). In a preferred embodiment, the lower head component (11) is configured as a cam and the upper head component (10) having a slightly protruding edge is adapted in the cross-sectional form.

1 Claim, 2 Drawing Sheets

SINGLE-PIECE FIXING ELEMENT IN THE FORM OF A SCREW OR NAIL

BACKGROUND OF THE APPLICATION

1. Field of the Invention

The invention relates to a fixing element, comprised essentially of a head and a shaft, embodied preferably as a nail or screw.

2. Description of the Related Art

Nails or screws are known in a plurality of embodiments for different uses alone or in combination with the use of plastic anchors.

In DE 38 34 285 A1 a screw hook is described comprising a shaft m provided with a thread and a head provided with a hook part, wherein the tool profile provided at the end face within the head, for example, a cross recess, is centrally symmetrically arranged to the shaft axis. With this configuration of the screw hook, the screw tightening, in particular, is solved in a beneficial way for the workman.

Moreover, screws are known from U.S. Pat. No. 5,059,077, comprising differently configured screw heads or caps that can be placed onto the screw heads so that the screws can be used for different applications.

For a simple attachment of pictures in picture frames on a wall it is possible to employ, for example, conventional wire nails with a round shaft and a flat head, optionally in connection with plastic anchors. If, because of a special hardness of the wall, it appears to be necessary, two bore holes are then usually provided, as is known in the art, at a spacing to one another into which suitable plastic anchors are then introduced and into which, in turn, the fixing elements are inserted from which the picture frame is suspended.

In this connection, the exact horizontal alignment of the two fixing elements may be a problem, or, when attaching the picture frame it is found that a readjustment is required because the fixing elements or bores, despite prior measuring, are not exactly horizontally aligned with one another.

More often than not this readjustment is carried out by bending the fixing elements, or it is necessary to measure anew, drill, and attach a new fixing element at a different location.

For avoiding these disadvantages, in DE 43 37 927 A1 a fastening and adjusting member is described comprising a cylindrical adjusting and support member wherein the fastening screw providing an axis of rotation is guided through the eccentric bore of the adjusting and support member. By means of an adjusting disc arranged at an end face of the adjusting and support member, the rotation of the adjusting screw of the adjusting and support member k is then adjustable in regard to its height position. A disadvantage of this known fastening and adjusting member is its two-part configuration which makes it necessary to tighten the fastening screw up to its end, respectively, because otherwise the adjusting and support member cannot be secured in the desired position.

Moreover, from FR-A-494055 a fastening means with a saddle-shaped screw or nail head is known, provided with an upper slot from which a string can be suspended. By rotating the fastening means about a certain angle, this suspended string can be adjusted with regard to its height position.

SUMMARY OF THE INVENTION

Based on this prior art, it is an object of the invention to significantly improve a fixing element of the aforementioned kind and to configure it with simple means such that a problem-free manufacture as well as a mounting and adjustment or realignment as simple as possible is achieved for a uniform alignment of the fixing elements relative to one another in one plane, without this requiring high demands in regard to the tolerance precision of the elements interacting with one another.

The solution to this object is achieved with the invention in that the head of the fixing element is a one-part configuration comprised of an upper head part and a lower head part and provided by means of axial rotation with a variable stroke, wherein the lower head part is embodied as an eccentric and the upper head part is matched with a slightly projecting rim to the cross-sectional shape, whereby in a simple way an adjustment or horizontal or angular alignment of the fixing elements, for example, by axial rotation can be achieved.

BRIEF DESCRIPTION OF THE DRAWINGS

It is shown in.

DETAILED DESCRIPTION OF PREFERRED EMBODIMENTS

Figure 1:
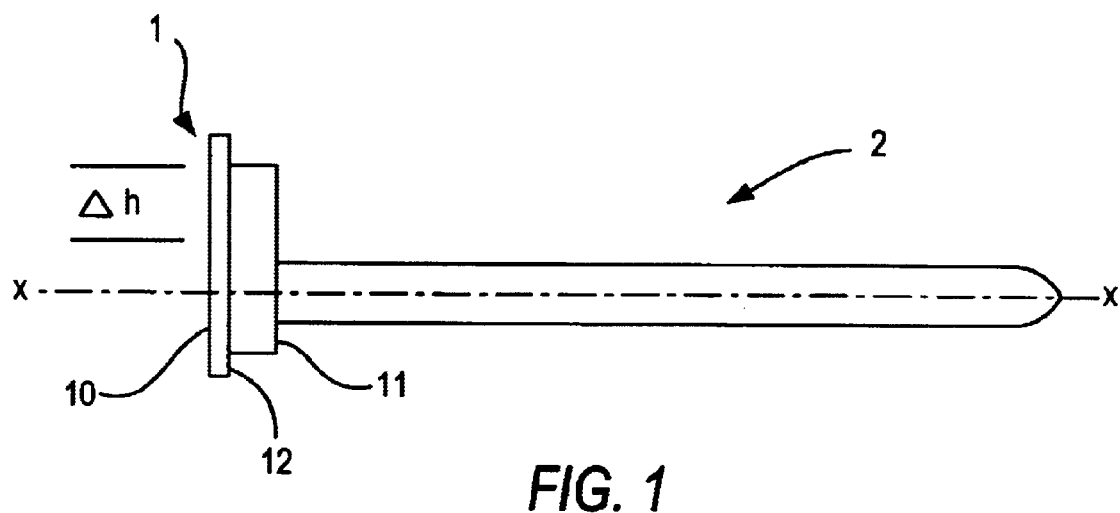
FIG. 1 a schematic side view of a fixing element according to the invention.
Figure 2:
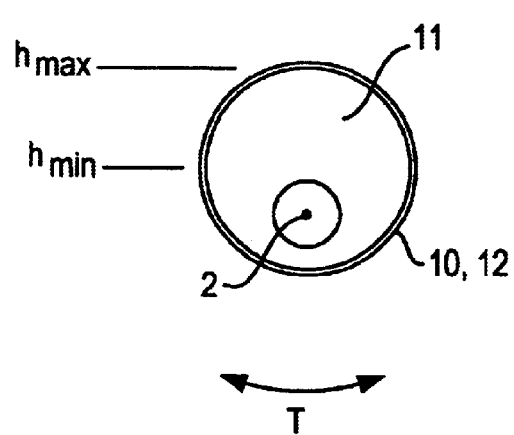
FIG. 2 a schematic front view according to FIG. 1.
Figure 3:
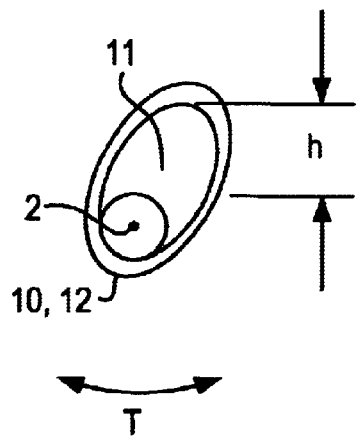
FIG. 3 a schematic front view as in FIG. 2 but with modified cross-section and slightly rotated.

The fixing element illustrated in FIGS. 1 through 3 is comprised substantially of a head (1) and a shaft (2), formed preferably as a nail or screw, wherein the head (1) is provided with a variable stroke (h). Expediently, this stroke (h) or Δh—sufficient for most applications—is between 0 and 5 mm, preferably between 1 and 3 mm.

The head (1) can be, as is known in the art, flat, cylindrical, semi-circular, oval and the like. Inasmuch as the fixing element is used as a screw, the head (1) is, of course, provided with a tool receiving opening (not illustrated) in the form of an elongate slot, a cross recess, hexagon socket, square socket and the like, and the shaft (2) has a thread (not illustrated).

The head (1) is comprised substantially of an upper head part (10) and a lower head part (11), wherein the lower head part (11) is an eccentric and the upper head part (10) is matched with a slightly projecting rim (12) preferably to the cross-sectional shape. The rim (12) can project approximately 0.5 to 1 mm or, depending on special use, can have any shape and depth. The rim (12) allows the engagement behind the object to be fastened, for example, a picture frame in order to prevent its accidental falling. The depth of the lower head part (11) is sized such that the profile of the picture frame or its suspending means are engaged from behind; in general, a depth or a spacing of up to 3 mm should be sufficient.

As can be seen in particular in FIG. 2, the lower head part (11) can be shaped as a disc. As an alternative, the lower head part (11) according to FIG. 3 can be in cross-section like a key bit or can be formed in any other way inasmuch as the inventive purpose is achieved, i.e., the head (1) is provided with a variable stroke (h). Expediently, the rim (12) of the upper head part (10) is corrugated in order to facilitate in this way the adjustment and rotation by hand or by a tool. In FIG. 3, the shaft (2) is aligned with the lower head part

(11) so that the possible actual stroke (h), i.e., $\Delta h = h_{max} - h_{min}$, can be maximized.

The head (1) can also be of a two-part configuration wherein as the lower head part (11), for example, a washer with eccentric bore (not illustrated) or a U-shaped bracket or bracket of a different shape (not illustrated) is provided which is brought into rotation-safe contact on the upper head part (10) by means of the shaft (2). The securing action against rotation can be, for example, realized in that the shaft (2) in this partial area has a square or polygonal cross-section, wherein the shape of the receiving opening of the lower head part (11) is matched thereto.

Figure 4:
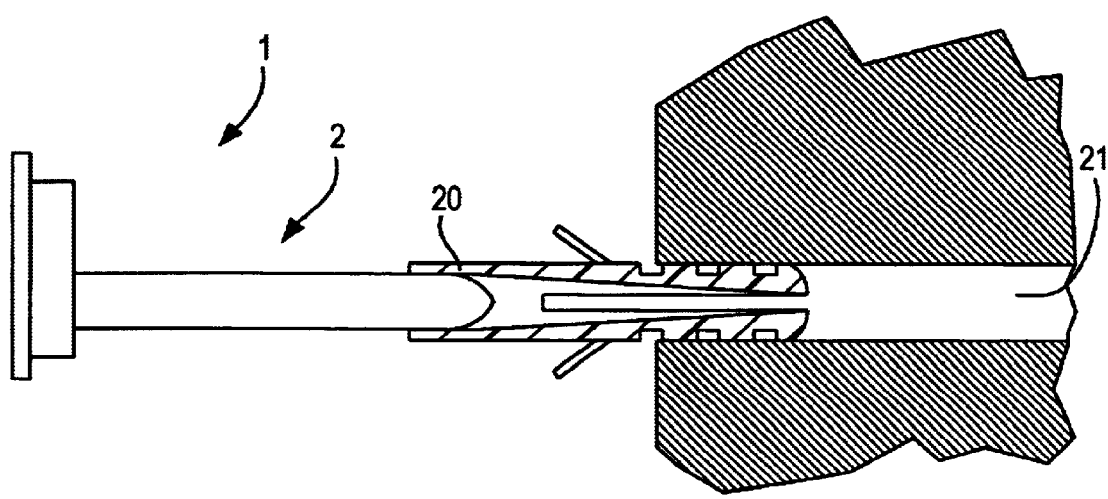
FIG. 4 another schematic side view showing the fixing element in combination with a plastic anchor.

The invention functions as follows: After measuring and attaching two fixing elements on the wall or any other suitable location, their exact horizontal alignment relative to one another is carried out in a simple way in that either only one fixing element or, for larger stroke requirements, both elements are rotated in the rotational direction (T) about the axis (x-x) and adjusted in this way. This can be realized, for example, also in such a way that a fixing element is inserted in effective connection with a plastic anchor 20, shown in FIG. 4, in two bore holes 21, respectively, and horizontally aligned. This is based on the assumption that the friction of the shaft in its receiving opening prevents a return movement.

The measures and configurations according to the invention are not limited to the embodiments illustrated in the drawings. Possible modifications of the fixing elements according to the invention can reside in that, for example, the lower head part and/or upper head part have different cross-sectional shapes and that, instead of metals or plastic materials, any suitable materials and shapes are used. Also, the fixing elements can be used in deviation from a horizontal alignment in any angular position up to a vertical alignment. The respective constructive configuration and arrangement of the fixing elements for adaptation to special uses lie within the knowledge of a person skilled in the art.

What is claimed is:

1. A fixing element comprised of a single piece as a nail or screw in combination with a wall anchor, the fixing element comprising a shaft received by the wall anchor and a head fixedly attached to the shaft, the head comprising a disc-shaped lower head part having a circular or oval cross-section attached to the shaft and an upper head part remote from the shaft, wherein the upper head part protrudes radially outwardly from the lower head part so as to form a step with the lower head part and an edge portion of the lower head part is in alignment with a periphery portion of the shaft, the shaft having an axis, and wherein the lower head part is attached eccentrically relative to the shaft axis, whereby a rotation of the fixing element results in a vertical movement of an edge of the head.

* * * * *